(12) United States Patent
Jäger (10) Patent No.: US 8,402,923 B2
(45) Date of Patent: Mar. 26, 2013

(54) TOY FOR PEOPLE OR ANIMALS

(75) Inventor: Claudius Jäger, Boulder, CO (US)

(73) Assignee: Artemis Rubber Technology Inc., Longmont, CO (US)

( * ) Notice: Subject to any disclaimer, the term of this patent is extended or adjusted under 35 U.S.C. 154(b) by 1887 days.

(21) Appl. No.: 11/234,434

(22) Filed: Sep. 23, 2005

(65) Prior Publication Data

US 2006/0032459 A1 Feb. 16, 2006

Related U.S. Application Data

(63) Continuation-in-part of application No. 10/213,870, filed on Aug. 6, 2002, now abandoned, and a continuation-in-part of application No. 10/858,220, filed on Jun. 1, 2004, now abandoned.

(51) Int. Cl.
*A01K 29/00* (2006.01)

(52) U.S. Cl. ...................................................... 119/707

(58) Field of Classification Search .................. 119/702, 119/703, 704, 705, 706, 707, 710, 711
See application file for complete search history.

(56) References Cited

U.S. PATENT DOCUMENTS

| | | | | |
|---|---|---|---|---|
| 6,067,941 A | * | 5/2000 | Axelrod | 119/707 |
| 6,186,096 B1 | * | 2/2001 | Miller | 119/709 |
| 6,202,598 B1 | * | 3/2001 | Willinger | 119/709 |
| 6,550,426 B2 | * | 4/2003 | Tsengas | 119/707 |
| 2007/0062459 A1 | * | 3/2007 | Costello et al. | 119/707 |

* cited by examiner

*Primary Examiner* — Monica Williams
(74) *Attorney, Agent, or Firm* — Jennifer Stachniak; Becker & Stachniak, P.C.

(57) ABSTRACT

A toy for people or animals, especially for dogs, is provided. The disc-shaped or component ring toy has a body having optional recesses on an outer surface thereof. The body comprises a ring core of a first, hard polymeric material, and a covering of a second, soft polymeric thermosetting material, natural rubber, or mixture of a thermosetting and non-thermosetting material which may be frictionally connected, thermally and chemically bonded, or otherwise mechanically interconnected to the first polymeric material.

20 Claims, 6 Drawing Sheets

TOY FOR PEOPLE OR ANIMALS

CROSS-REFERENCE TO RELATED APPLICATIONS

This application claims the priority of German application 10152070.0 filed Oct. 25, 2001 and is a continuation-in-part of abandoned application Ser. No. 10/213,870 filed Aug. 6, 2002 and application Ser. No. 10/858,220 filed Jun. 1, 2004 now abandoned.

BACKGROUND OF THE INVENTION

Chew toys for animals, especially dogs, are well-known in the art. Toys comprised of elastic polymers and/or having recesses and grooves such as those disclosed in U.S. Pat. No. 4,802,444 and U.S. Reissue Pat. 34,352, are also well-known. Further, a simple disc-shaped toy for animals is well-known in the art, as disclosed in U.S. Pat. Nos. 3,359,679; 4,132,030; 4,196,540; 4,204,357; 4,456,265; 4,737,128; 4,889,347; 4,919,083; 4,955,842; 5,676,581; 5,934,966; 5,984,753; and 6,672,253. Other chew toy shapes are known in the art, such as rope toys having loops at opposing ends to a knotted center. Such toys serve not only for keeping the animal busy and entertained, but also are used for caring for the animal's teeth. Therefore, for hygienic reasons, it is desirable for the animal to occupy itself frequently with the toy.

Additionally, it is well-known that animals which are stimulated and occupy themselves by playing with toys are often better behaved and pose less of a nuisance through typical "boredom" behaviors, such as barking, trying to escape yards or homes, and chewing on undesirable items such as shoes. Therefore, there is a deep-seated need to provide toys to animals to improve their hygiene and behavior.

Further, flying disc toys are well-known in the art for human use as well, showing different design elements including animal appendages, display screens, collapsible designs, extra-lift producing designs, such as those shown in U.S. Pat. Nos. 6,860,783; 6,695,666; 6,599,162; 6,595,823; 6,585,552; 6,390,879; 6,200,185; 5,816,879; 5,611,720; 5,348,509; 5,261,846; 5,032,098; 4,869,699; 4,915,661; 4,290,226; 4,212,131; 4,183,168; 449,082; D387,817; D346,626; D345,586; D295,429; and D293698.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The toy of the present invention is characterized primarily in that it comprises at least one core ring of a hard polymeric, preferably thermoplastic material with a covering of a soft polymeric material, especially a rubber-like or rubber-feeling, elastic polymeric material. The toy of the present invention is also characterized by use of a thermosetting material, natural rubber, or mixture of thermosetting and non-thermosetting materials as the soft polymeric material. Further, the harder core may be hollow which may be helpful to prevent damage to the toy. Finally, the utilization of the softer thermosetting polymer material with a hard core provides a better compression dynamic than prior art toys, thereby providing a toy that is more stimulating to the animal.

As a consequence of the inventive configuration of the toy, an animal utilizing the toy has the chewing sensation of a bone that is covered with meat, whereby the core can be hollow in order to imitate a hollow marrow-filled bone, and possibly, as an optional benefit, to hold treats, and more preferably, acoustical or optical effects, etc. A scented and/or flavored insert to stimulate an animal to play with the toy would also be possible. The toy thus on the one hand has a shape that is comfortable and stimulating for the animal and on the other hand is easy to manufacture, as described herein.

When a toy is utilized by a person, with or without an animal, the inventive hard ring and soft covering give a comfortably soft yet firm grip. This improved gripping can improve both throwing catching. Further, the softer outer surface provides cushioning which may lessen injury when one is inadvertently struck by the disc.

The material of the covering is a thermosetting material, natural rubber, or a mixture of a thermosetting material and a non-thermosetting material such as natural rubber. The outside surface of the core ring is formed or revised mechanically after forming to provide a rough surface texture. The covering material is then formed around the ring without it being necessary to dispose an additional layer of a binder, an adhesive or the like between the core ring and the covering. Alternatively, some mechanical interconnection can be used, for example via undercuts and/or over-molding, or thermally achieved chemical interconnection between the hard plastic core and the outer rubber-like coating may be used.

The harder material of the core may be a thermoplastic that is particularly suitable for forming this chemical bond. Such materials include but are not limited to a polyamide (PA) or a modified polyphenylene ether (PPE). With such a combination of materials, it is possible to provide the animal with a chewing sensation of a bone that is covered with meat, but one which is more durable and stable against external forces that tend to attack and destroy it. Further, it is easy to manufacture.

The hard core ring, which is preferably fixedly connected with the covering through the mechanical bond between the thermosetting material and the roughened surface of the thermoplastic material (or other suitable materials) improves the durability and stability of the toy. Unlike prior art hard or soft disc toys, the combination of the hard core with the elastic covering ensures that the toy jumps or rebounds well when it falls upon a hard surface, and thus enables an entertaining and exciting toy for the animal. Further, the use of the softer covering and harder core make it easier for an animal to pick up the disc—a formerly frustrating endeavor for an animal engaged in disc play.

In an alternate embodiment with a hollow internal structure of the core ring, it is possible to dispose therein an electronic device that produces musical tones, acoustical effects, or light effects, and/or releases scents or flavors, thus exerting a particular fascination for the animal or person. The electronic device can be embodied in such a way that it produces different effects depending upon how the animal or person manipulates the toy.

Further specific features of the present invention will be described in detail subsequently.

Figure 1:
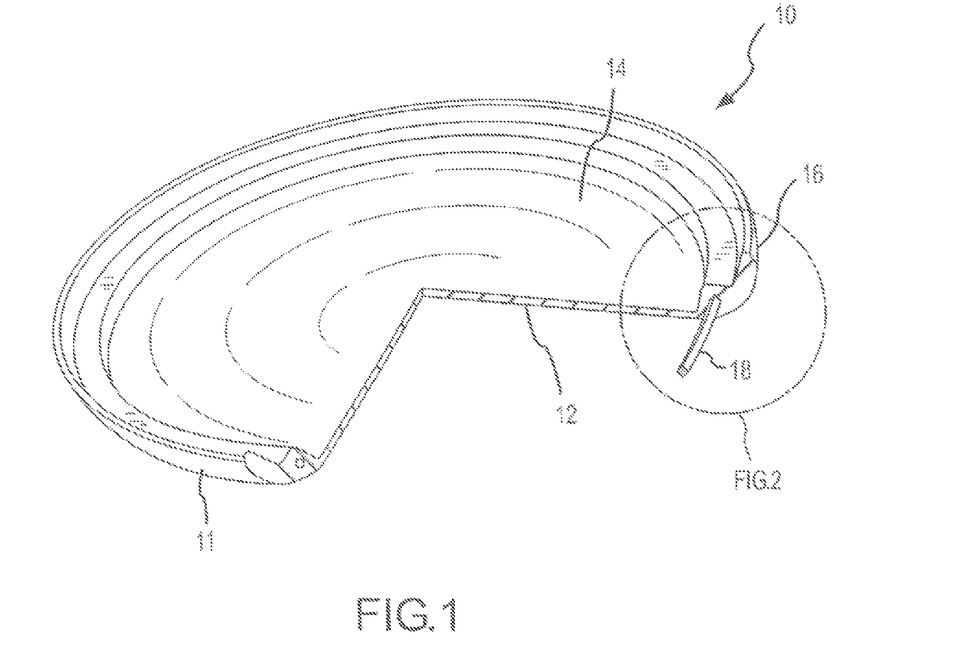
FIG. 1 is a partially cross-sectioned end view of one exemplary embodiment of the inventive toy for animals.

It is an object of the present invention to improve the toy of the aforementioned general type such that it is particularly interesting to an animal and stimulates the animal to occupy itself with the toy Description of Preferred Embodiments Referring now to the drawings in detail, an embodiment of the toy of the invention is shown in FIG. 1. Toy 10 in the first embodiment is shown as having a primarily disc-shaped configuration, formed from covering 11 and core ring 18.

Figure 2:
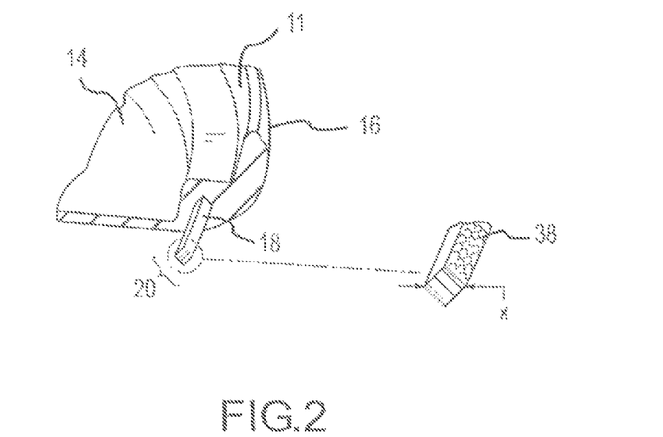
FIG. 2 is an end cross-sectional view through the toy of FIG. 1 depicting the cross-section of side wall 16 enclosing solid core ring 18, particularly cross-sectional configuration 20 of core ring 18.
Figure 3:
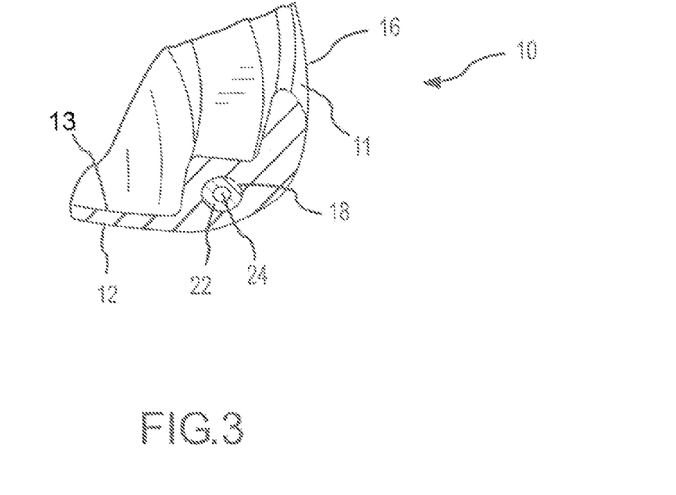
FIGS. 3 and 3b are end cross-sectional views through the toy of FIG. 1 depicting the cross-section of side wall 16 enclosing hollow core ring 18 having outer section 22 and interior space 24 and depicting an additional unit in the form of an electronic device 56 that sends out acoustical or optical signals.
Figure 4:
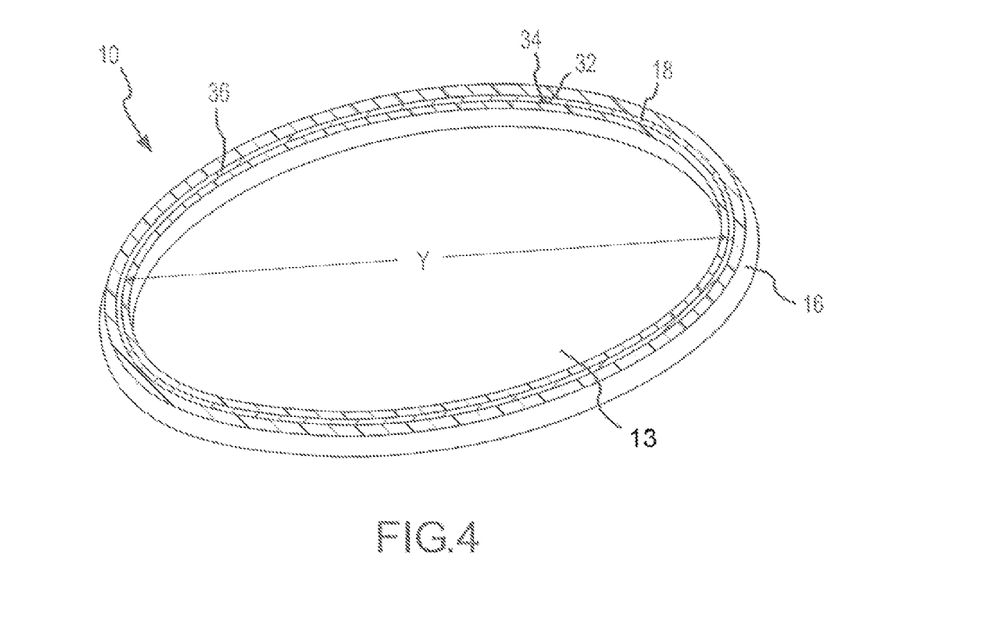
FIG. 4 is a longitudinal cross-section view through side wall 16, particularly depicting covering 18 circumferentially disposed within wall 16.

Disc shape toy 10 is round in circumference (as shown in FIG. 1), having a convex upper surface 12 that functions as an air foil, and a concave underside 13 surrounded by a circumferential rim/side wall 16, that provides gyroscopic action as the disc is tossed through the air with a backspin. Upper surface 12, concave underside 13, and side wall 16 are composed of covering material 11. Core ring 18 is disposed within rim 16, preferably extending the entire circumference of rim 16, as shown in FIGS. 1-3. Core ring 18 preferably has a cross-sectional diameter, x (as shown in FIG. 2) much smaller than its ring diameter, y (as shown in FIG. 4). However, it is envisioned that the core ring may have larger cross-sectional diameters than pictured, especially when utilizing optional electronic devices.

As shown in FIG. 2, core ring 18 may comprise a solid thermoplastic material in any suitable cross-sectional configuration 20, including, but not limited to rectangular, circular, oval, square, and any known polygonal shape. As shown in FIG. 3, core ring 18 of toy 10 may also comprise a hollow ring formed of thermoplastic material in any suitable cross-sectional configuration 20, including, but not limited to rectangular, circular, oval, square, or any known polygonal shape, having outer section 22 and interior space 24.

Figure 5A:
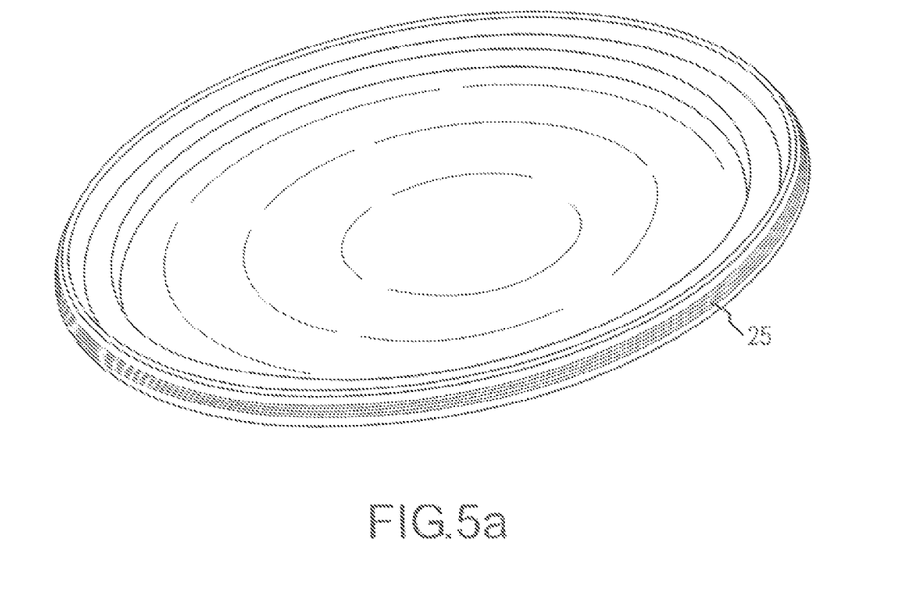
FIGS. 5a & 5b are an embodiment utilizing surface grooves 25 and ridges 29 as indentation/extension combinations for hygienic purposes.
Figure 5B:
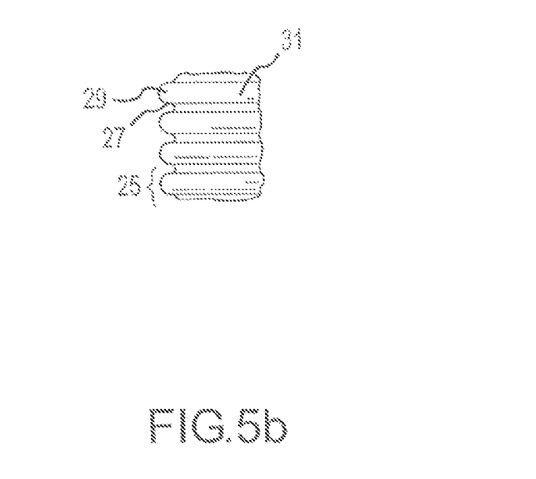

Alternate embodiments, as shown in FIGS. 5a and 5b, may utilize peripherally extending grooves, dimples, and/or bumps or other similar indentation/extension combinations known in the art. When the toy is in use for an animal, for example a dog, which plays with the inventive toy, the teeth of the animal penetrate or enter into grooves 25 when the animal grasps toy 10 with its mouth. The animal's teeth and/or gums beneficially rub against interior walls 27 of the grooves 25 or against upper surfaces 29 of ridges 31. In so doing, the teeth and/or gums are cleaned of food residue, coatings on the teeth, etc. Further, such indention/extension combinations can provide a gripping surface, thereby improving a person's throwing and catching ability with the disc.

In preferred embodiments of the invention, toy 10 has core ring 18 and sheathing or covering 11, wherein the core and the covering preferentially comprise different materials, as shown in FIGS. 1-3. Covering 11 is comprised of a natural rubber, thermosetting polymeric material, or mixture of a thermosetting material and a non-thermosetting material which is softer than core ring 18, and preferably having elastic, rubber-like qualities.

Preferably, covering 11 comprises either an unmixed composition of a particular thermosetting material or a composition having a mixture of materials including at least one thermosetting material known in the art, such as but not limited to natural rubber (NR), styrene-butadiene rubber (SBR), isoprene rubber (IR), ethylene propylene diene terpolymer rubber (EPDM), nitrile terpolymer rubber (NBR), hydrogenated nitrile terpolymer rubber (HNBR), carboxylated nitrile terpolymer rubber (XNBR), polyurethane (PU), fluorocarbon rubber (FPM), flurosilicone rubber (MVQ), and/or modified flurorosilicone rubber (FMVQ).

More preferably, natural rubber (NR), isoprene rubber (IR) and/or styrene-butadiene rubber (SBR) are utilized in their unmixed form or in a mixture with other thermosetting materials and/or other polymeric materials as the covering of the present invention. Other thermosetting materials, including but not limited to those listed above may also be utilized in their unmixed form or in mixtures with other thermosetting materials and/or other polymeric materials as well.

Preferably, the material of covering 11 will have a hardness between approximately 20 and approximately 80 Shore A [DIN 53505 and ASTM 22140]. More preferably, the hardness will be between approximately 30 and approximately 70 Shore A. Most preferably, the hardness will be between approximately 35 and approximately 65 Shore A.

Use of thermosetting materials provide a surprisingly useful advantage in that the materials of the covering may be chemically bonded by a thermally derived bond to the material of the core, thereby providing a fixed, stable combination of covering and core which need not utilize less stable mechanical interconnections to arrive at the combination, or worse, utilize potentially unstable and sometimes hazardous binders to arrive at such a connection. Thermosetting materials are particularly useful in providing a thermally derived chemical bond since a thermosetting polymer "sets" upon heating and cannot be re-melted, unlike thermoplastics known in the art which may be softened again if the toy becomes heated. This, in turn, would make connections of a thermoplastic less stable and less durable than the connections of the thermosetting material of the present invention.

Further, the use of the thermosetting cover to chemically bond to the core provides additional versatility in designs and other structure for the toys. In prior art devices, mechanical interconnections and/or use of binders (which are typically dark in color, most usually black) prevented flexibility in design elements. For example the apparatus of the present invention can have different colors for the core and for the covering where in prior art mechanical devices, the interconnection would, in most cases, have been visible given the necessary protrusion of one element into another to provide the interconnection. In the prior art devices utilizing binders, the unsightly binder between layers would prevent any ornamentation-oriented showing of an inner layer because of concurrent display of the unsightly binder. In the present invention however, ornamental cuts or partial covering of the inner layer (the core—or additional colored layers of core or covering) can be achieved without display of unsightly mechanical interconnections or binders.

Further, use of the thermosetting bond to a hollow core is beneficial in allowing the manufacturer to utilize less material than in preparing a solid core toy and also reduces the amount of cure time necessary for the core to set. Therefore, the use of a hollow core is also more cost- and time-effective to a manufacturer.

Core ring 18 comprises a material that is necessarily harder than the material of covering 11. Preferably, the core material comprises a thermoplastic such as, but not limited to polyamide (PA), polyphenylene ether (PPE), polypropylene (PP), polystyrene (PS), acrylonitrile-butadine-styrene (ABS), acetal polyoxymethene (POM), polycarbonate (PC), polyethylene terephthalate (PET), polybutylene terephthalate (PBT), polyvinyl chloride (PVC) and modifications thereof, wherein such resins preferably have a melting point of approximately 400° F. or greater. Most preferably, the core material comprises a thermoplastic such as a PA or modified PPE. Thermosetting materials and mixtures of thermoplastics and thermosetting materials with an appropriate hardness (greater than the hardness of the covering) may be utilized. However, other materials known in the industry and/or thermoplastics or thermosetting materials with a hardness of preferably at least 50 on the Shore D scale and a tensile strength of at least 100 N/mm$^2$ may also be utilized. More preferably, the core material will have a hardness of between approximately 55 and approximately 90 on the Shore D scale and a tensile strength of at least 1500 N/m$^2$, and preferably, at least 2700 N/m$^2$.

Figure 6:
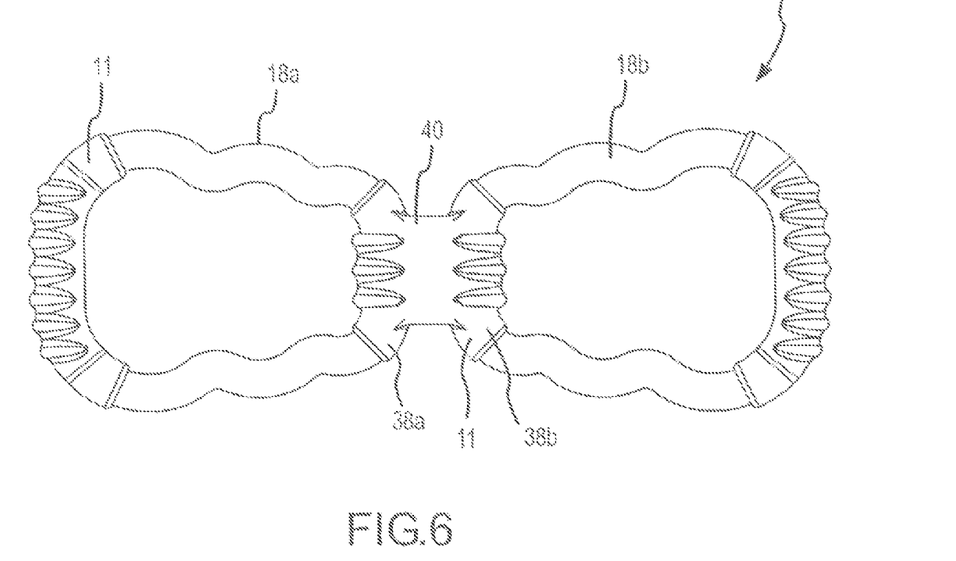
FIGS. 6, 6a, 6b are a partially cross-sectioned view and partial views of an additional embodiment of the invention, showing a version similar in overall shape to a typical rope toy, but utilizing the more durable materials of the invention and the inventive connections between the materials.

If a chemical bond is utilized, it is achieved in a two component injection molding system with a one-step integral operation wherein the hard thermoplastic component is first molded and then the soft thermosetting component is injection molded around (or partially around) the thermoplastic core, but may be alternately done in a two-step process, utilizing typical injection molding and curing techniques for thermosetting and thermoplastic materials, respective of the type of thermosetting materials used, as is well-known in the art for each material. However, another preferred method of connection between the ring and the covering requires either forming (for example, press molding) the ring to have a roughened surface 38, as shown in FIGS. 2 and 6 or, alternatively, mechanically roughening the surface after forming the ring, for example, by sanding the surface with a rough grit sander. The covering material is then formed around the ring and as a result, enters into the indentations and around the extrusions formed by mechanically roughening or molding the surface to be rough. Friction holds the two surfaces, hard and soft, together.

Core ring 18 is optionally hollow, having an outer wall 22 and an interior space 24 as is depicted in FIG. 3. In particular, core ring 18 of the embodiment as shown in FIG. 3 comprises a cylindrical tube with relatively thick walls wherein the end faces of the core may be left open. Thus, the toy, while disc-shaped, has the sensation off a hollow, marrow bone that is covered with soft meat for an animal. The use of a hollow or latticed embodiment is a great improvement over all configuration prior art toys comprising multiple hardness layers since the harder, hollow core allows the toy to deform and return to its prior non-depressed state with greater ease and less chance of breakage or permanent deformation.

The inventive toy has somewhat surprising superiority in bounce over prior art toys with the hollow thermoplastic core/thermosetting covering combination of the present invention. Hard prior art toys (such as solid polyamide discs) have very little bounce because of lack of compression/deformation in the material. On the other hand, soft prior art toys, such as non-reinforced rubber or cloth discs deform too greatly, such that most of the kinetic energy introduced by a fall is lost as heat. The amount of bounce, or the "work" performed is calculated by the force (for example, from a fall or drop) which is force is converted into potential energy in the resulting deformation of the toy and which is then released again as kinetic energy plus energy lost as heat.

Work, W, is calculated as $$W = F \times D_{def}$$

Wherein F=force, $D_{def}$=distance of deformation in the toy.

In the hard prior art toys, there is little work or bounce which comprises the work since there can be little deformation of the toy. In the soft prior art toys, while there was great potential for increased work as a bounce, there was also a great loss of energy as heat. With the present art invention, it is believed that the resilience offered by the strengthening of the toy with its hard core provides sufficient resilience to prevent the major loss of energy found with prior art toys and that the soft covering provides the necessary deformation to provide the desired work in the form of a bounce. And, particularly with the embodiments utilizing ridges, the ridges act somewhat in the manner of a spring to store the potential energy (by their deformation) and release them and recoil (conversion to kinetic energy) given the resilience of the core.

Figure 3B:
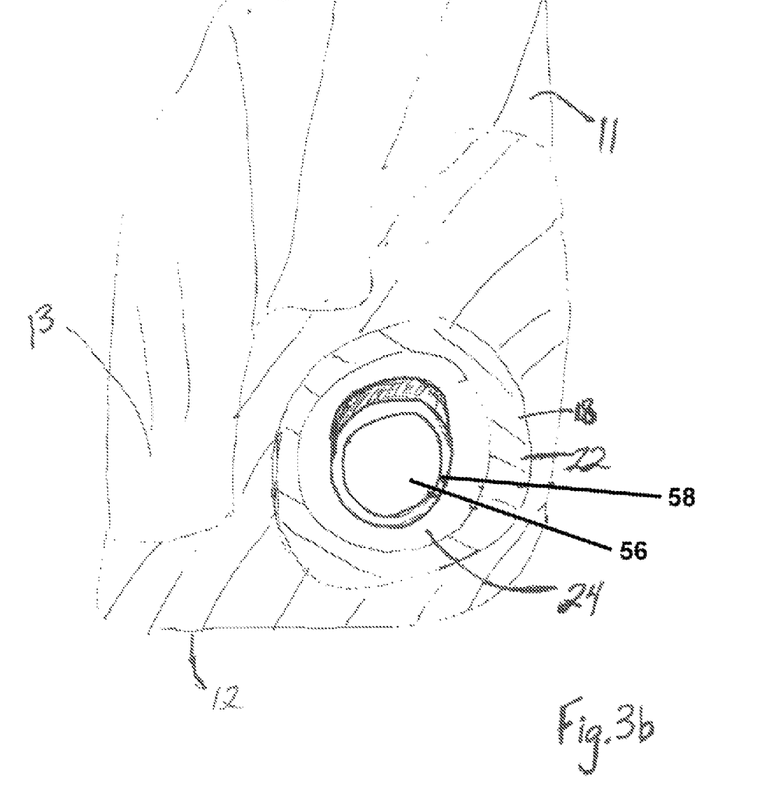

In conjunction with FIG. 3, an embodiment of the inventive toy as shown in FIG. 3b may be utilized that is provided with an additional unit in the form of electronic device 56 that sends out acoustical or optical signals, and thus provides an additional attraction or fascination for the animal to encourage it to play with the toy. The electronic device can, for example, be provided with a light emitting diode that is supplied from a small battery and constantly blinks. However, in an alternate embodiment, the electronic device can also be provided with sensors that establish if the animal is manipulating the toy and possibly with what effort, and in conformity therewith can emit signals, such as musical notes and noises. Such sensors can, for example, react to pressure, shaking, or during throwing and/or striking of the toy on the ground. It is possible, but not necessary, that such electronic devices are replaceable component units therein, for instance, electronic devices whose battery has been depleted through play may be removed from the inventive toy and replaced with a new electronic unit.

The electronic device is preferably disposed within a pressure-tight capsule or shell 58 that is sealed against moisture as described in related U.S. patent application Ser. No. 10/858, 220, filed Jun. 1, 2004, and that is inserted into a tubular ring core.

The embodiments described herein can also be provided with optional grooves on at least part of the surface of the covering 11. These optional grooves can be in the form of shallow grooves or ribs.

An embodiment as shown in FIG. 4, can also have a dispensing/holding hole 32, preferably at one location only. Treats for animals can be inserted into the hollow interior of the toy through this hole 32. Flaps or retaining elements 34 can also be provided on the covering 11, and can project into the area of the hole 32, to hold treats and to prevent them from being released too easily. To provide an emergency breathing passage in the event that the toy gets stuck in the throat of an animal, and blocks its natural breathing process, another portion of the covering 11, such as the opposite end of the toy, can optionally be provided with a small ventilation hole 36 which is not intended to hold treats.

Figure 6A:
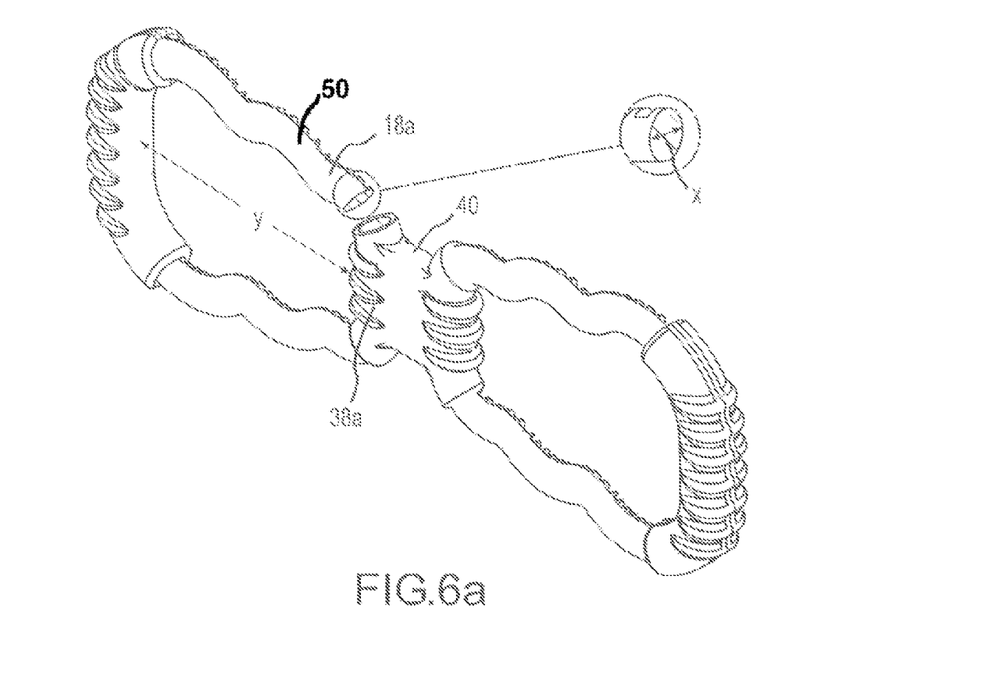

It is understood that similar effects could be achieved by using multiple ring-shaped cores stacked above one another for a deeper disk. Alternatively, another embodiment of the invention as depicted in FIG. 6 shows multiple ring cores 18 $a,b$ with covering 11 disposed thereon and joined by an interior panel 40. Interior panel 40 preferably comprises the same categories of materials used for covering 11. However, it should be noted that the covering and panel need not comprise exactly the same materials for any particular embodiment of the invention. Alternately, panel 40 may comprise a material such as those disclosed for core ring 18 supra. Interior panel 40 joins rings 18 *a,b* preferably by enclosing rings 18 *a,b* within the material of panel 40 by utilizing the methods of molding or mechanical interconnection described for enclosing ring 18 within covering 11 as disclosed above. However, any other suitable mechanical interconnection of the rings with a central portion 40 may be utilized. Further, it should be understood that central portion 40 need not utilize a flat panel shape as depicted in FIG. 6, but could include other shapes known in the art, for example spheres or other three-dimensional shapes. Additionally, surface protrusions or indentations may also cover the at least a portion of the surface of central joining portion 40. Further, it should be understood that additional embodiments of the invention are anticipated and claimed herein in that additional rings and joining portions can be utilized to extend the toy. Core rings 18 *a,b* are disposed within loops 38 *a,b*, preferably extending the entire circumference of loops 38 *a,b*, as shown in FIG. 6. Core rings 18 *a,b* preferably have cross-sectional diameter, x (as shown in FIG. 6a) much smaller than their ring diameter, y (as shown in FIG. 6a). However, it is envisioned that the core rings may have larger cross-sectional diameters than pictured, especially when utilizing optional electronic devices.

Figure 6B:
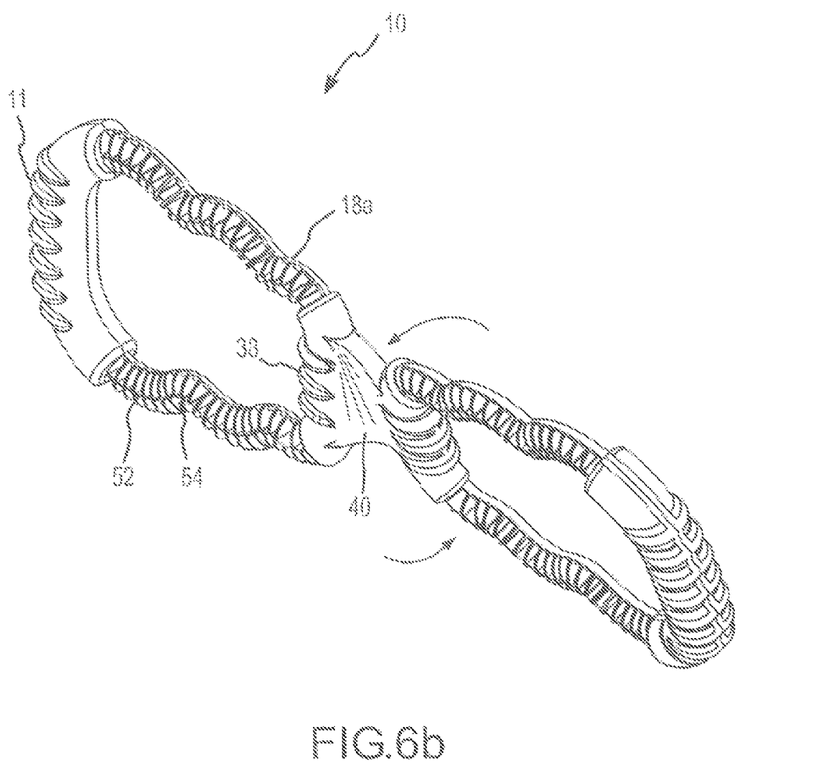

As discussed supra core rings 18 *a,b* may comprise a solid thermoplastic material in any suitable cross-sectional configuration, including, but not limited to rectangular, circular, oval, square, and any known polygonal shape. Core rings 18 *a,b* may also comprise a hollow ring formed of thermoplastic material in any suitable cross-sectional configuration, including, but not limited to rectangular, circular, oval, square, or any known polygonal shape, having an outer section and interior space. Additionally, lattice techniques known in the art and as shown on a reverse side of toy 10 in FIG. 6b may be utilized. As shown in FIG. 6b, an upper surface 50 of rings 18 *a,b* is solid while a lower surface 52 forms a lattice 54. Such a lattice may be continual around a ring or interspersed with solid portions of ring 18, particularly solid portions may be useful under coverings 11 usable as a handle.

Further it is understood that the core could be contained within the covering without mechanical or chemical interconnection, however, for such embodiments it is preferred that the ring be completely or substantially disposed within the covering to ensure it's position is not disturbed.

The specification incorporates by reference the disclosure of German priority document 101 52 070.0 filed 25 Oct. 2001 and U.S. application Ser. No. 10/213,870 filed Aug. 2, 2002, and U.S. application Ser. No. 10/858,220 filed Jun. 1, 2004.

The present invention is, of course, in no way restricted to the specific disclosure of the specification and drawings, but also encompasses any modifications within the scope of the appended claims.

I claim:

1. A toy comprising:
   at least one ring-shaped core of a first polymeric material, said ring-shaped core having an outer surface;
   a covering of a second thermosetting polymeric material, wherein covering is disposed outwardly over at least portions of said outer surface of said ring-shaped core; and
   wherein said first polymeric material is harder than said second polymeric material.

2. The toy according to claim 1, wherein said toy comprises at least two said ring-shaped cores having at least one joining portion disposed between said at least two ring-shaped cores.

3. The toy according to claim 1, wherein said outer surface is roughened before said covering is disposed outwardly thereon.

4. A toy according to claim 1, wherein said first polymeric material comprises a thermoplastic.

5. A toy according to claim 4, wherein said thermoplastic is comprises a thermoplastic material or mixed material selected from the group consisting of PA, PPE, PP, PS, ABS, POM, PC, PET, PBT, PVC, and modifications thereof.

6. A toy according to claim 1 wherein said second thermosetting polymeric material comprises a thermosetting material or mixed material selected from at least one member of the group consisting of NR, IR, SBR, EPDM, NBR, HNBR, XNBR, PU, FPM, MVQ, FMVQ, and modifications thereof.

7. A toy according to claim 1, wherein said second thermosetting polymeric material comprises a hardness of between approximately 20 and approximately 80 Shore A.

8. A toy according to claim 7, wherein said second thermosetting polymeric material comprises a hardness of between approximately 30 and approximately 70 Shore A.

9. A toy according to claim 8, wherein said second thermosetting polymeric material comprises a hardness of between approximately 45 and approximately 65 Shore A.

10. A toy according to claim 1, wherein said second thermosetting polymeric material of said covering is chemically bonded to said first polymeric material by a thermally derived bond.

11. A toy according to claim 1 wherein said first polymeric material comprises a tensile strength of at least approximately 1500 N/m$^2$.

12. A toy according to claim 11 wherein said first polymeric material comprises a tensile of at least approximately 2700 N/m$^2$.

13. A toy according to claim 1 wherein said first polymeric material comprises a hardness of at least 50 Shore A.

14. A toy according to claim 13 wherein said first polymeric material comprises a hardness of between approximately 55 and approximately 90 Shore A.

15. A toy according to claim 1, wherein said core is hollow.

16. A toy according to claim 15, wherein said hollow core has at least one opening.

17. A toy according to claim 16, wherein an electronic device is disposed within said hollow core.

18. A toy according to claim 17, wherein said electronic device can produce an effect selected from the group consisting of acoustical effects, olfactory effects, and visual effects.

19. A toy according to claim 18, additionally comprising a sealing capsule, wherein said electronic device is disposed within an interior of said sealing capsule, and wherein said sealing capsule is disposed within said hollow core.

20. A toy according to claim 1, wherein indentation/extension combinations are provided on at least a portion of an outer surface of said covering.

* * * * *